(12) United States Patent
Biles et al.

(10) Patent No.: US 11,119,925 B2
(45) Date of Patent: Sep. 14, 2021

(54) APPARATUS AND METHOD FOR MANAGING CAPABILITY METADATA

(71) Applicant: Arm Limited, Cambridge (GB)

(72) Inventors: Stuart David Biles, Bury St. Edmunds (GB); Graeme Peter Barnes, Cambridge (GB)

(73) Assignee: Arm Limited, Cambridge (GB)

(*) Notice: Subject to any disclaimer, the term of this patent is extended or adjusted under 35 U.S.C. 154(b) by 36 days.

(21) Appl. No.: 16/609,298

(22) PCT Filed: Apr. 19, 2018

(86) PCT No.: PCT/GB2018/051034
§ 371 (c)(1),
(2) Date: Oct. 29, 2019

(87) PCT Pub. No.: WO2018/203032
PCT Pub. Date: Nov. 8, 2018

(65) Prior Publication Data
US 2020/0192800 A1    Jun. 18, 2020

(30) Foreign Application Priority Data
May 2, 2017 (GB) ..................................... 1706971

(51) Int. Cl.
*G06F 12/0815* (2016.01)
*G06F 16/907* (2019.01)
(Continued)

(52) U.S. Cl.
CPC ........ *G06F 12/0815* (2013.01); *G06F 9/3816* (2013.01); *G06F 9/467* (2013.01); *G06F 12/0811* (2013.01); *G06F 16/907* (2019.01)

(58) Field of Classification Search
CPC .... G06F 9/3816; G06F 9/467; G06F 12/0811; G06F 12/0815; G06F 16/907
See application file for complete search history.

(56) References Cited

U.S. PATENT DOCUMENTS 5,450,563 A     9/1995  Gregor
9,274,956 B1 *  3/2016  Salyers ............... G06F 12/0868
(Continued)

FOREIGN PATENT DOCUMENTS

GB    2 540 206    1/2017
GB    2 541 714    3/2017

OTHER PUBLICATIONS

International Search Report and Written Opinion of the ISA for PCT/GB2018/051034, dated Jul. 4, 2018, 16 pages.
(Continued)

*Primary Examiner* — Eric T Oberly
(74) *Attorney, Agent, or Firm* — Nixon & Vanderhye P.C.

(57) ABSTRACT

Apparatus comprising cache storage and a method of operating such a cache storage are provided. Data blocks in the cache storage have capability metadata stored in association therewith identifying whether the data block specifies a capability or a data value. At least one type of capability is a bounded pointer. Responsive to a write to a data block in the cache storage a capability metadata modification marker is set in association with the data block, indicative of whether the capability metadata associated with the data block has changed since the data block was stored in the cache storage. This supports the security of the system, such that modification of the use of a data block from a data value to a capability cannot take place unless intended. Efficiencies may also result when capability metadata is stored separately from other data in memory, as fewer accesses to memory can be made.

22 Claims, 15 Drawing Sheets

(51) Int. Cl.
*G06F 9/38* (2018.01)
*G06F 9/46* (2006.01)
*G06F 12/0811* (2016.01)

(56) References Cited

U.S. PATENT DOCUMENTS

| | | | |
|---|---|---|---|
| 9,804,891 B1* | 10/2017 | Adalier | H04L 9/002 |
| 9,916,191 B1* | 3/2018 | Pan | G06F 11/0763 |
| 2013/0138892 A1 | 5/2013 | Loh et al. | |
| 2014/0317384 A1 | 10/2014 | Greenhalgh | |
| 2015/0378917 A1* | 12/2015 | Busaba | G06F 9/3842 |
| | | | 711/137 |
| 2016/0011984 A1* | 1/2016 | Speer | G06F 3/067 |
| | | | 711/102 |
| 2018/0089088 A1* | 3/2018 | Jakowski | G06F 12/0607 |

OTHER PUBLICATIONS

Combined Search and Examination Report for GB1706971.7, dated Oct. 12, 2017, 5 pages.

\* cited by examiner

A) SET   PR1 = 140000   ⟶ trigger error

B) SET   PR1 = 140000

LD   R5,  PR1   ⟶ trigger error

| "TDP" TAG DIRTY INFORMATION PROVIDED | "TP" TAGS PROVIDED | "DD" DATA DIRTY | "TD" TAG DIRTY |
|---|---|---|---|
| X | 0 | 0 | 0 |
| X | 1 | 0 | 0 |
| 1 | X | 0 | 1 |
| 1 | 0 | 1 | 0 |
| 1 | 1 | 1 | 0 |
| X | 0 | 1 | 1 |
| X | 1 | 1 | 1 |
|   |   |   |   |

FIG. 14

APPARATUS AND METHOD FOR MANAGING CAPABILITY METADATA

This application is the U.S. national phase of International Application No. PCT/GB2018/051034 filed Apr. 19, 2018 which designated the U.S. and claims priority to GB Patent Application No. 1706971.7 filed May 2, 2017, the entire contents of each of which are hereby incorporated by reference.

The present disclosure relates to and apparatus and method for managing capability metadata.

In a capability-based architecture certain capabilities are defined for a given process and an error can be triggered if there is an attempt to carry out operations outside the defined capabilities. The capabilities can take a variety of forms, but one type of capability is a bounded pointer (also referred to as a "fat pointer"). For a bounded pointer, the pointer value may identify, or be used to determine, the address of a data value to be accessed or an instruction to be executed, for example. However, the pointer value may also have associated range information which indicates an allowable range of addresses when using the pointer value. This can be useful to ensure that the address determined from the pointer remains within certain bounds to maintain security or functional correctness of behaviour. In addition, certain permission/restriction information may be specified in association with the pointer value of a bounded pointer. The range information and any permission/restriction information for a bounded pointer may be referred to as capability information, and within a capability-based architecture such a bounded pointer (including its associated capability information) may be referred to as a capability. Capability metadata may be stored in association with data stored in storage elements of the apparatus. The capability metadata can be used to identify whether the associated data block specifies a capability, or instead contains data that does not represent a capability (also referred to herein as general purpose data). The capability metadata can also specify certain additional information. When accessing specified data, the associated capability metadata can be referenced in order to determine whether the data block represents a capability or general purpose data. There remains the need to provide improved mechanisms for managing capability metadata within storage elements of systems employing a capability based architecture.

In one example described herein there is provided an apparatus comprising cache storage to store data blocks, each data block having capability metadata stored in association therewith identifying whether each said data block specifies a capability or a data value, wherein at least one type of capability is a bounded pointer and cache control circuitry responsive to a write to a data block stored in the cache storage to set a capability metadata modification marker in association with the data block, wherein a value of the capability metadata modification marker is indicative of whether the capability metadata associated with the data block has changed since the data block was stored in the cache storage.

In one example described herein there is provided a method of operating cache storage comprising the steps of storing data blocks in the cache storage, storing capability metadata in association with each data block identifying whether each said data block specifies a capability or a data value, wherein at least one type of capability is a bounded pointer, in response to a write to a data block stored in the cache storage, setting a capability metadata modification marker in association with the data block, wherein a value of the capability metadata modification marker is indicative of whether the capability metadata associated with the data block has changed since the data block was stored in the cache storage.

In one example described herein there is provided an apparatus comprising means for caching data blocks, means for storing capability metadata in association with each data block identifying whether each said data block specifies a capability or a data value, wherein at least one type of capability is a bounded pointer, means for setting a capability metadata modification marker in association with a data block stored in the means for caching data blocks, in response to a write to the data block, wherein a value of the capability metadata modification marker is indicative of whether the capability metadata associated with the data block has changed since the data block was stored in the means for caching data blocks.

The present invention will be described further, by way of example only, with reference to embodiments thereof as illustrated in the accompanying drawings, in which:

FIG. 1 schematically illustrates an apparatus in accordance with one embodiment;

Figure 4:
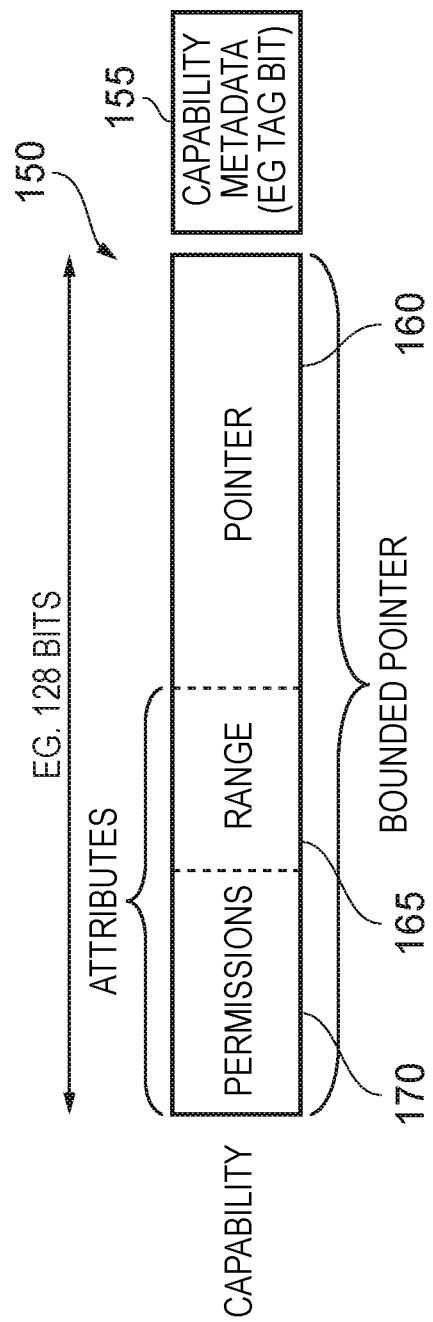
Figure 5A:
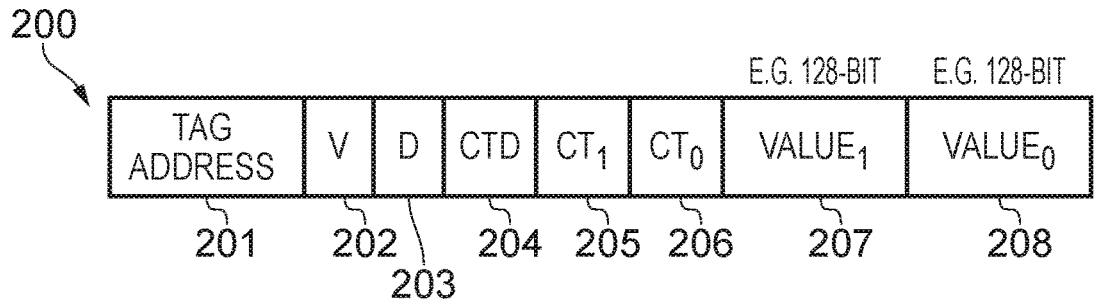
Figure 5B:
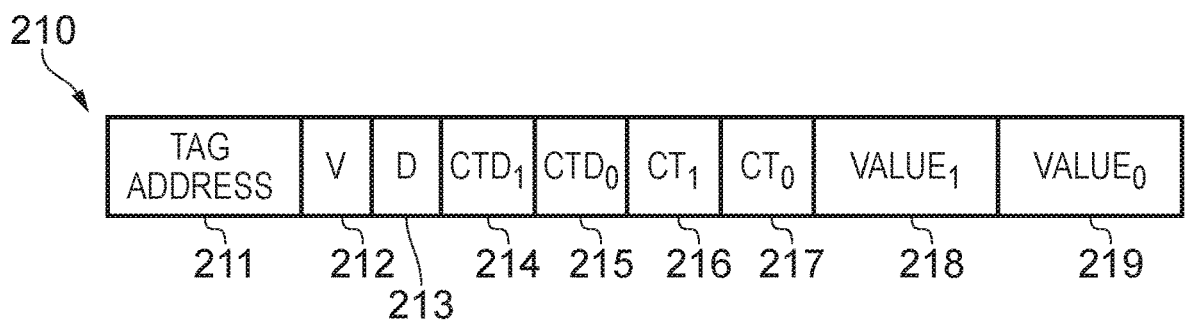
Figure 5C:
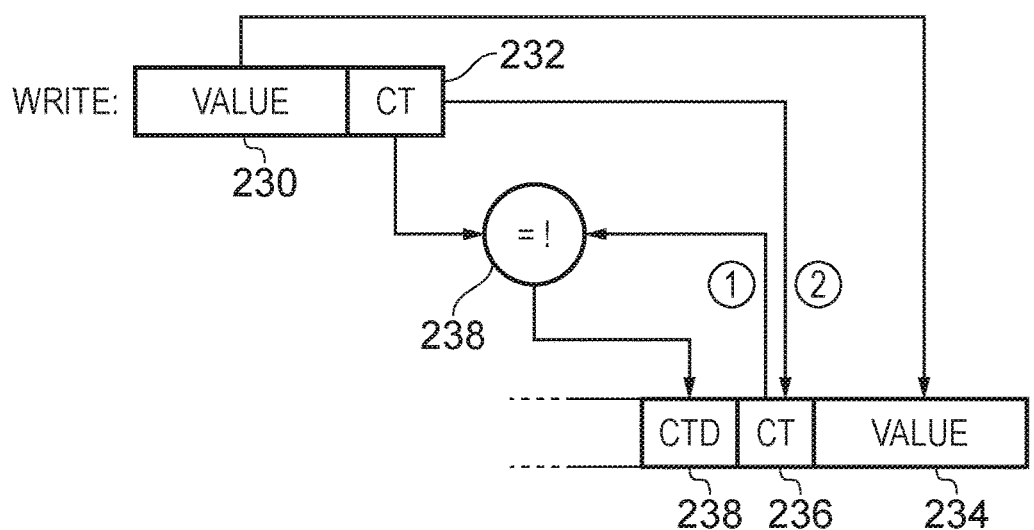
Figure 6:
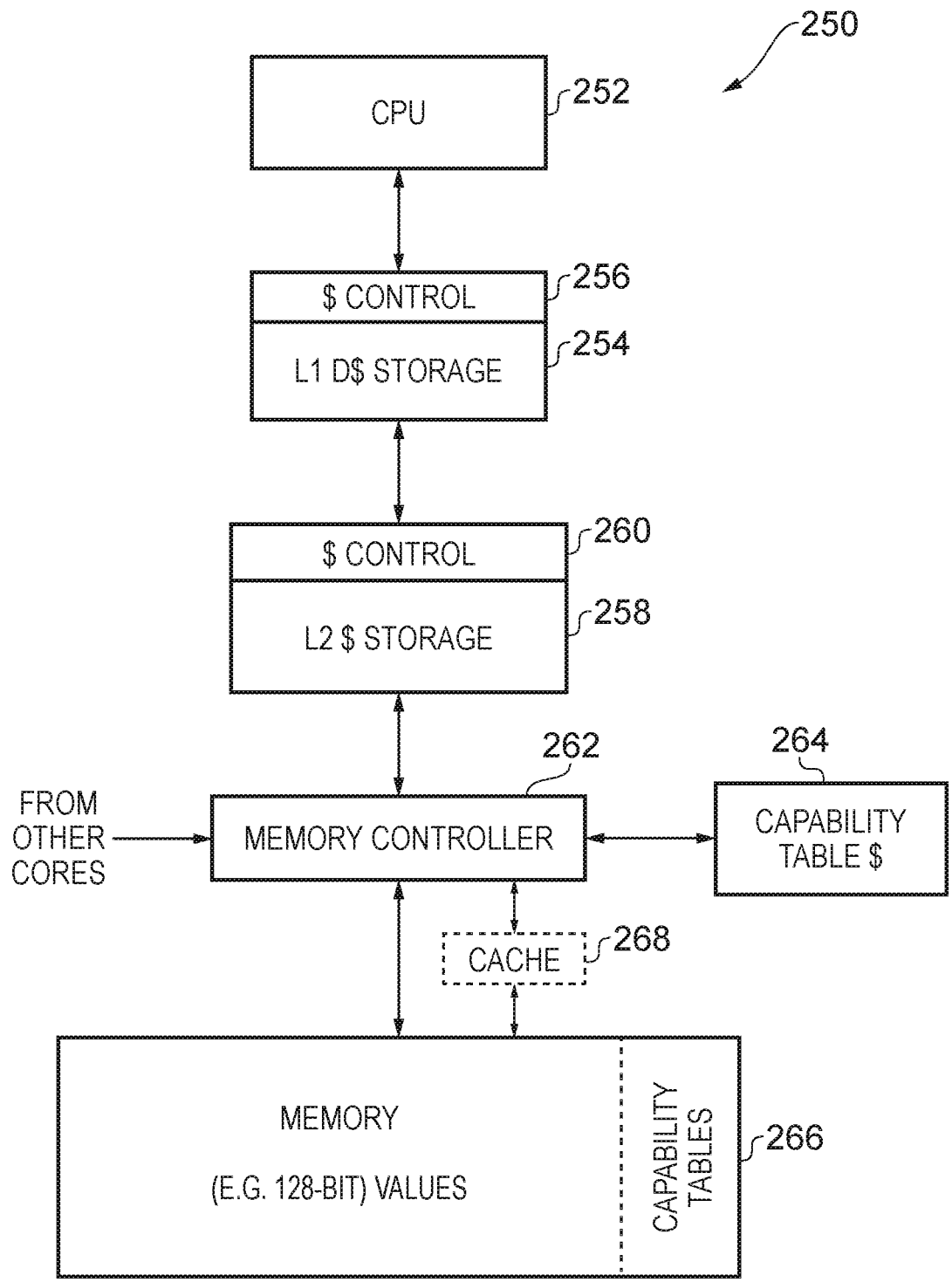
Figure 7B:
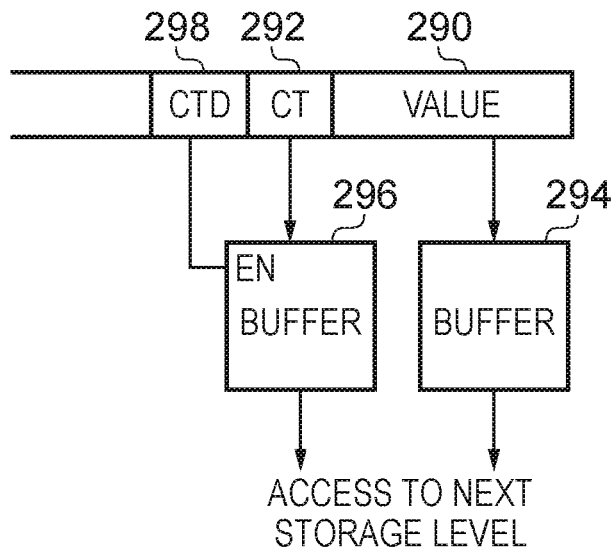
Figure 7A:
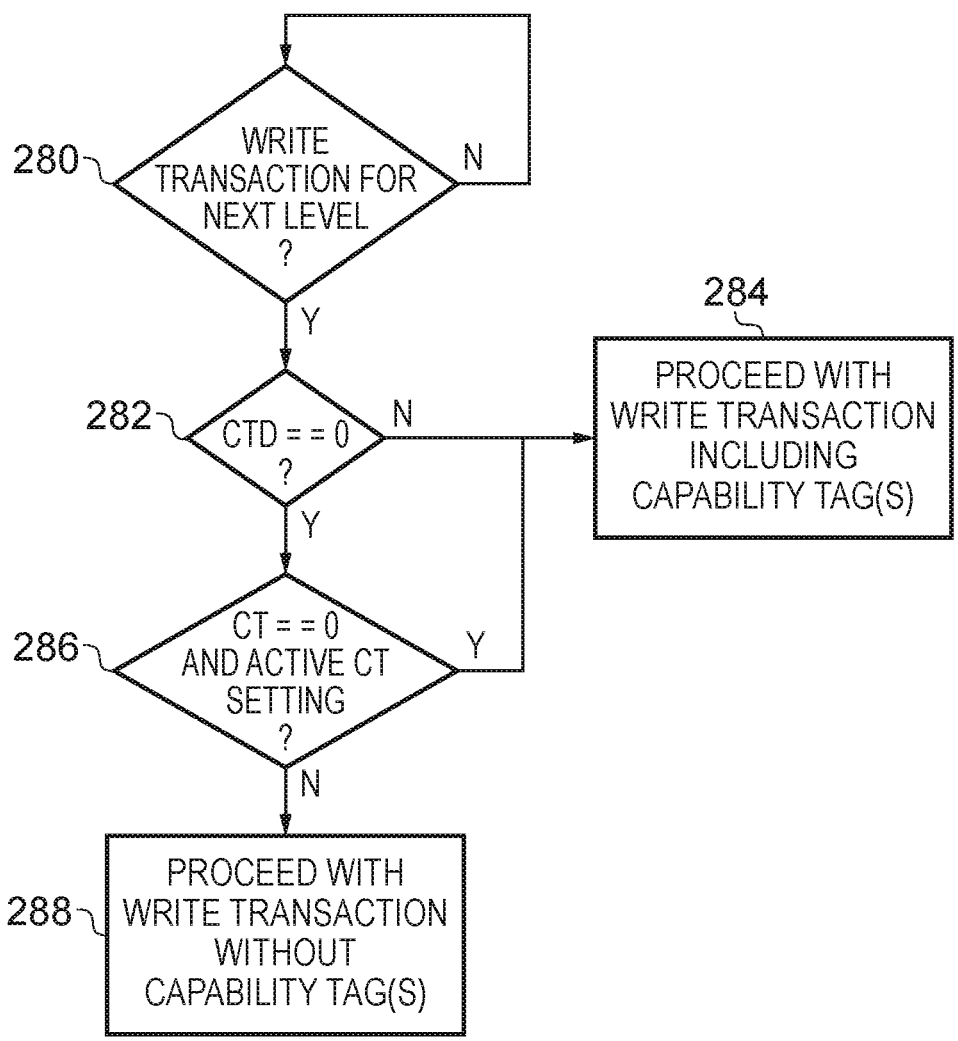
Figure 8:
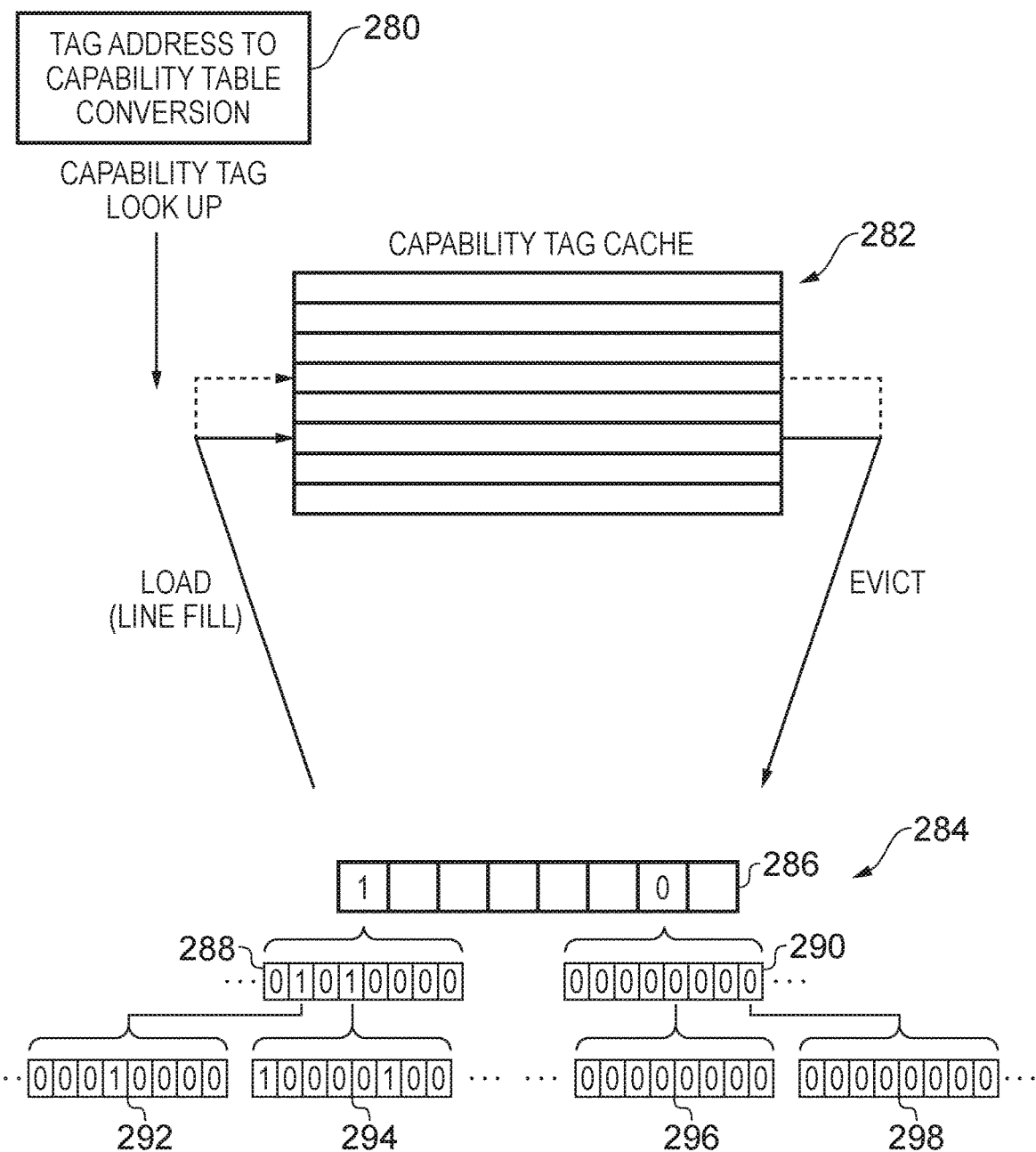
Figure 9:
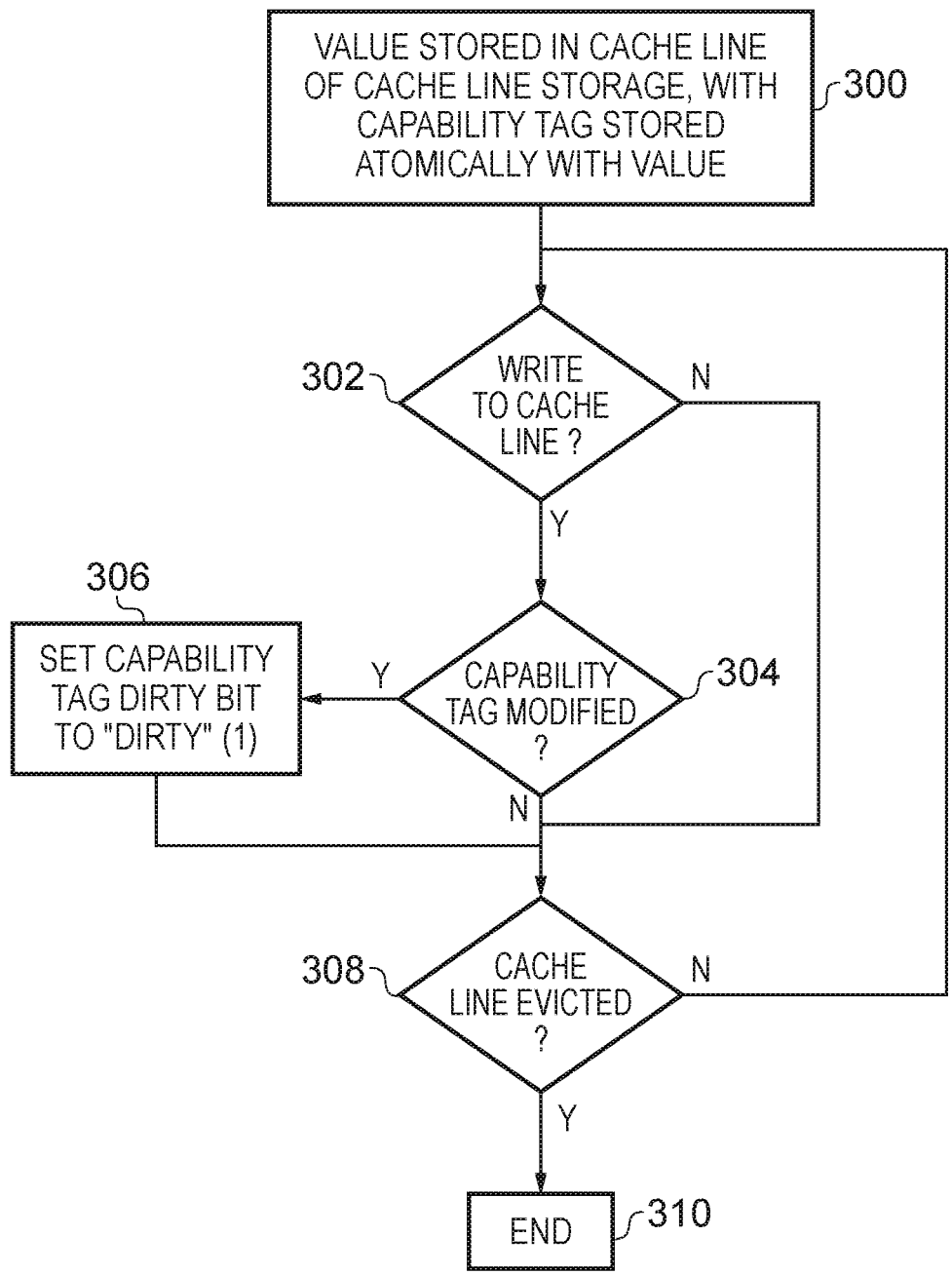
Figure 10:
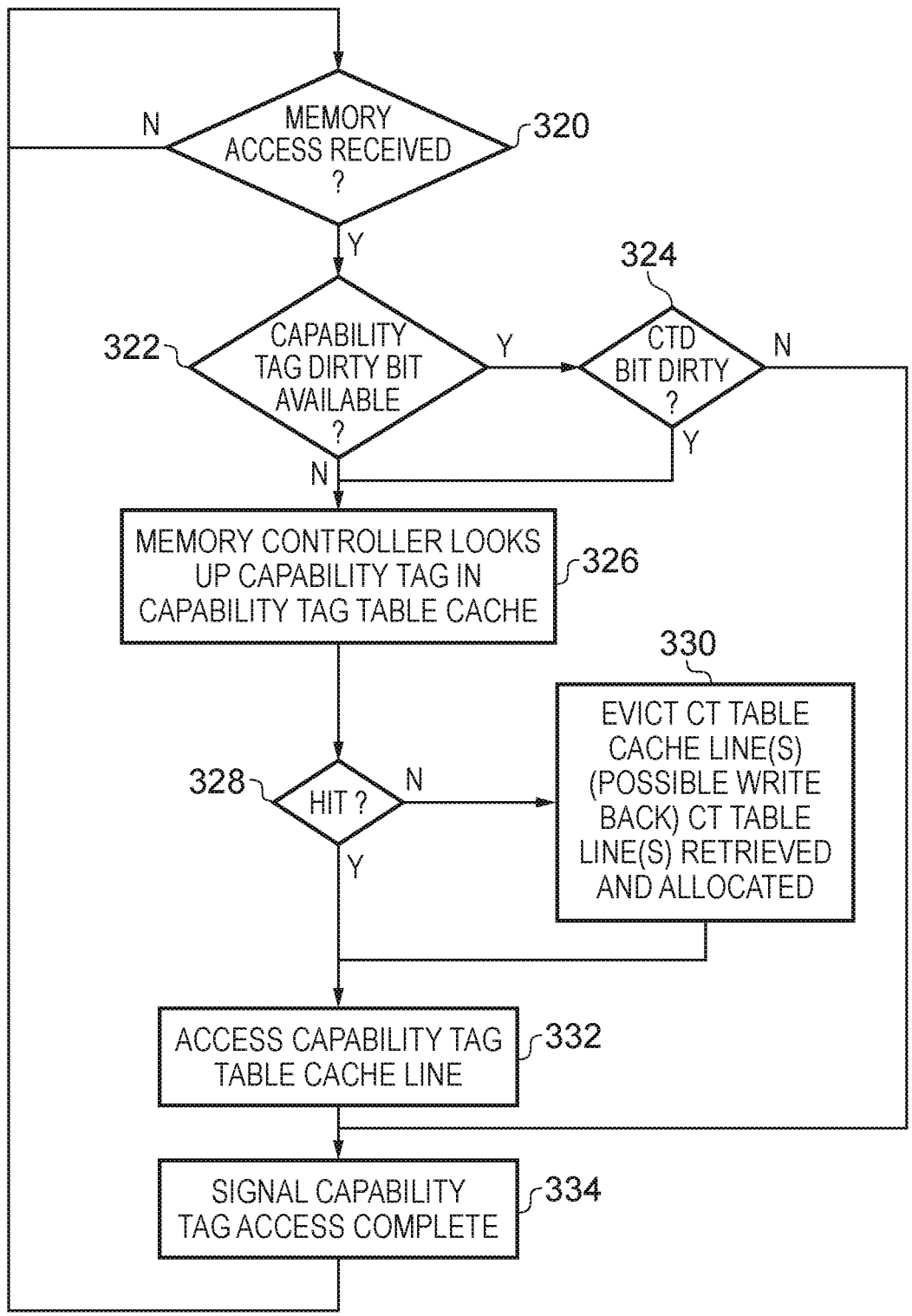
Figure 11:
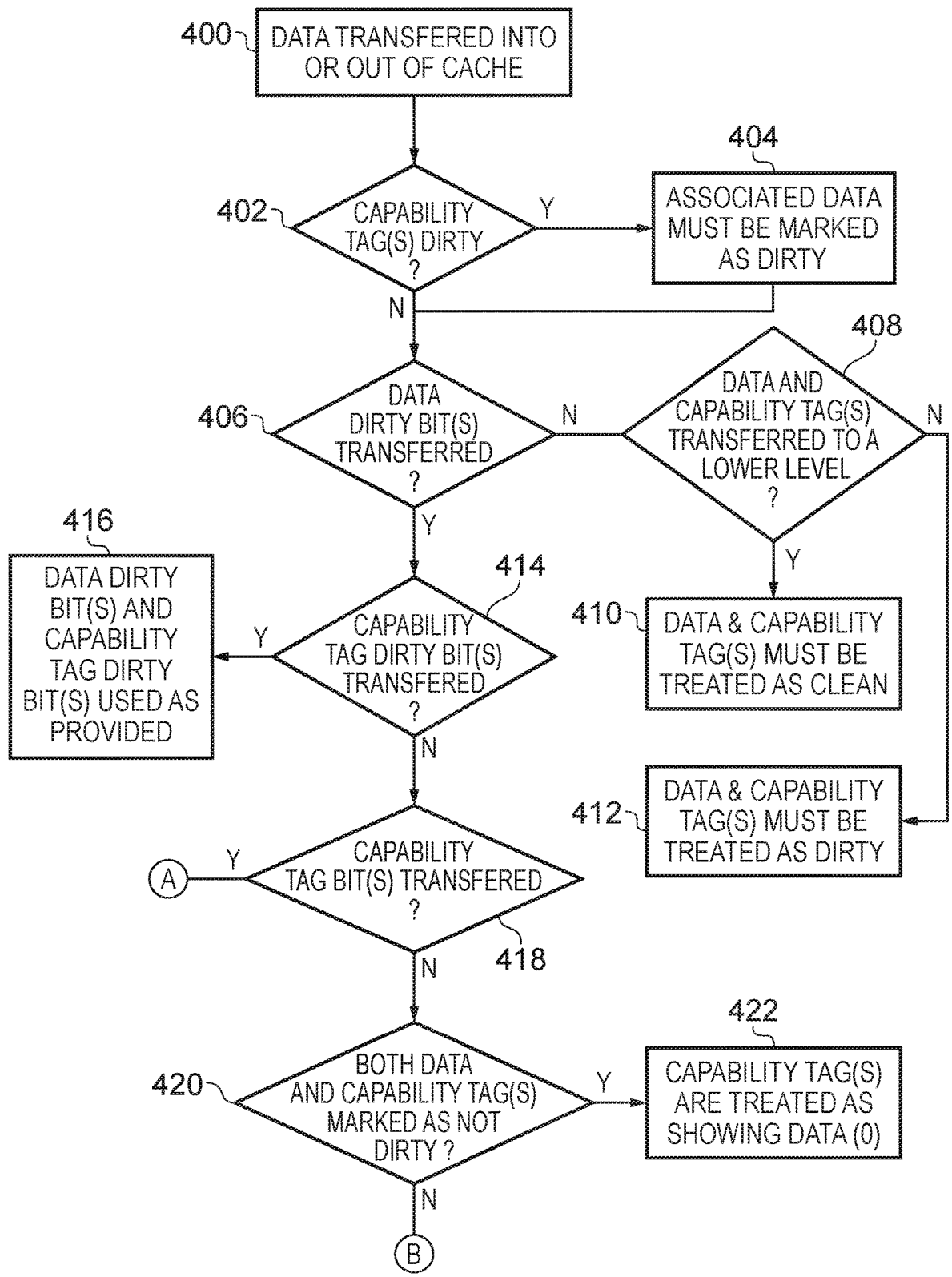
Figure 12:
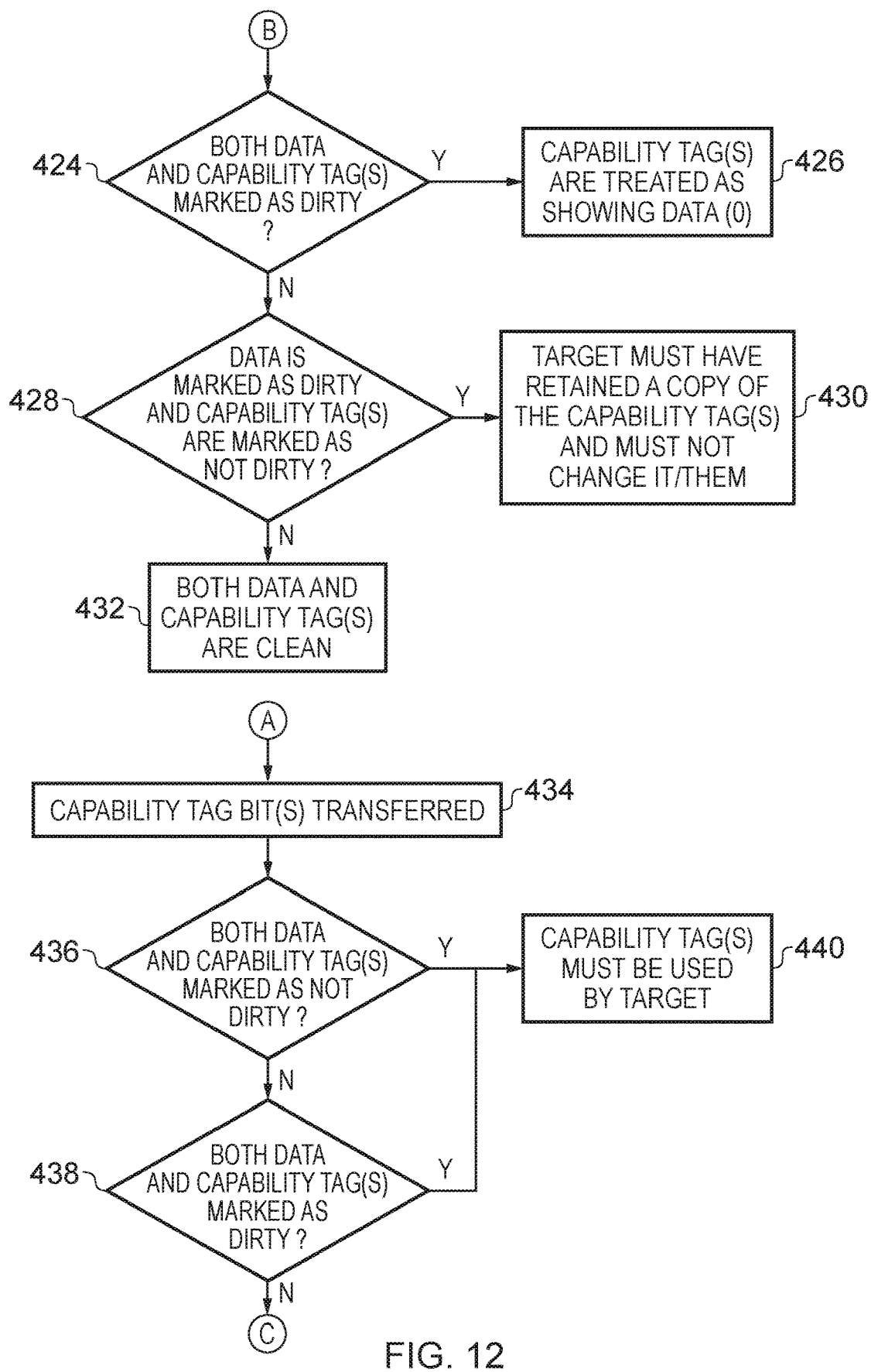
Figure 13:
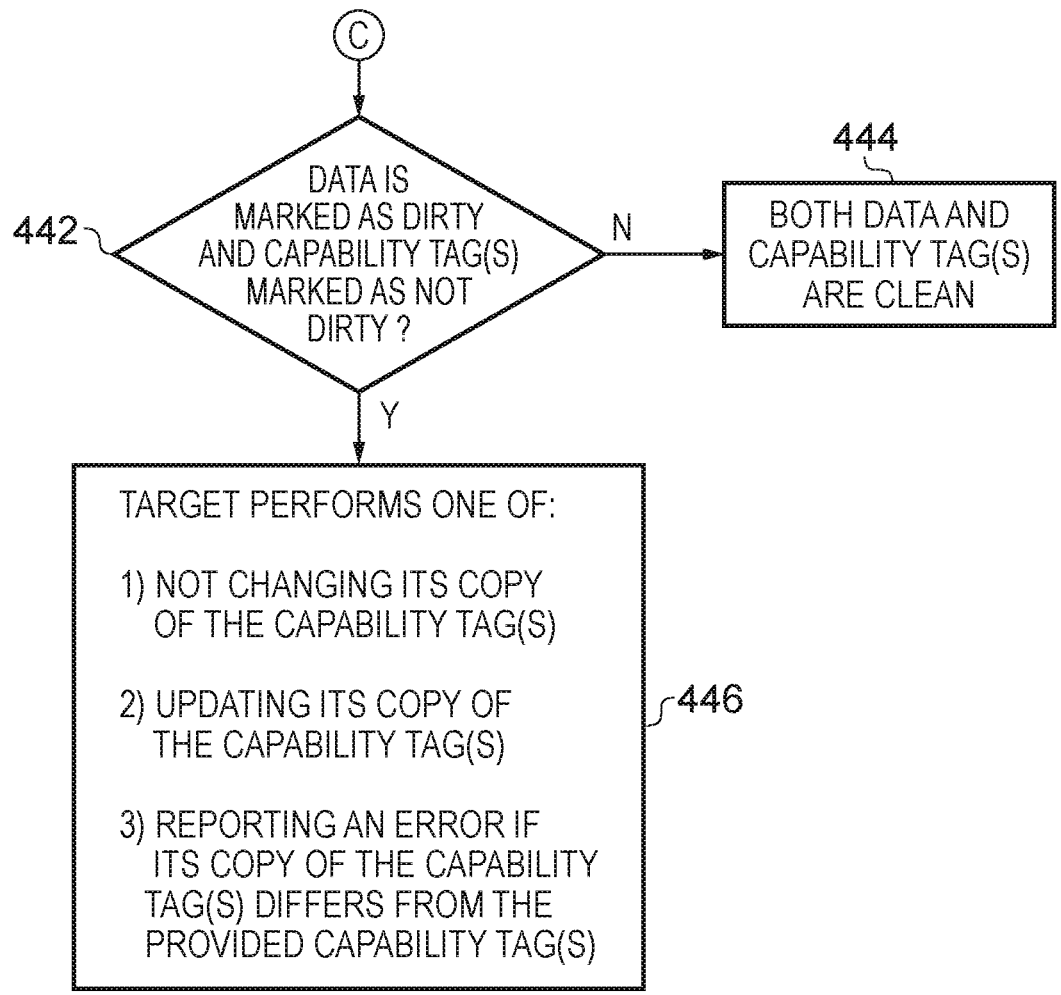
Figure 15:
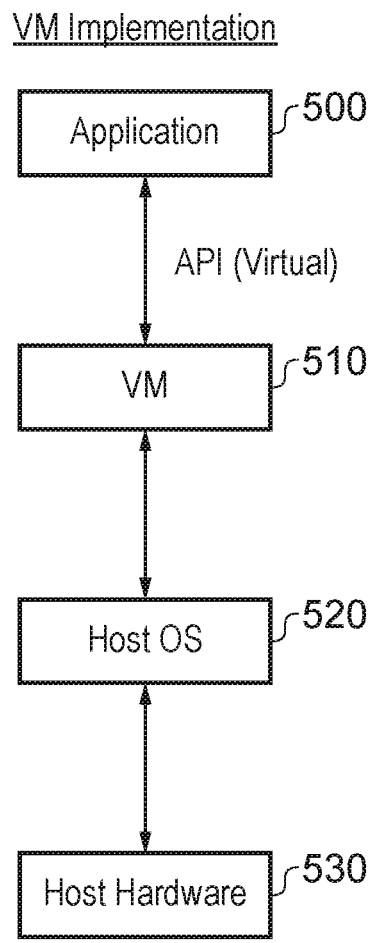

FIG. 4 schematically illustrates various fields provided within a capability that takes the form of a bounded pointer, along with associated capability metadata information, in accordance with one embodiment;

FIG. 5A shows an example cache line in which two values are stored along with associated capability metadata and a capability tag dirty bit in accordance with one embodiment;

FIG. 5B shows an example cache line storing two values with associated capability metadata and a capability tag dirty bit for each capability tag in the cache line, in accordance with one embodiment;

FIG. 5C schematically illustrates circuitry used to update the capability tag dirty bit in a cache line when a value stored in that cache line is updated by a write operation, in accordance with one embodiment;

FIG. 6 schematically illustrates an apparatus in one embodiment comprising two levels of cache storage, a memory controller, a capability table cache, and a memory, in accordance with one embodiment;

FIG. 7A shows a sequence of steps which are taken in one embodiment to determine whether a data write transaction should include capability metadata;

FIG. 7B illustrates an example of circuitry for suppressing the inclusion of capability metadata in a data write transaction on the basis of the value of a capability tag dirty bit;

FIG. 8 shows the use of a capability tag table cache temporarily to store lines of capability tag tables from memory and their updating by eviction and load, in accordance with one embodiment;

FIG. 9 shows a sequence of steps which are taken in a cache to update a capability tag dirty bit when the capability tag associated with a value stored in the cache line is updated, in accordance with one embodiment;

FIG. 10 shows a sequence of steps which are taken by a memory controller when a memory access is received, on the basis of capability tag dirty bit information and capability tag bits stored in a capability tag table cache, in accordance with one embodiment;

FIGS. 11, 12, and 13 show a sequence of steps which are taken when data is transferred into or out of a cache in order to determine the data and capability tag clean/dirty statuses when these are fully provided, partially provided, or not provided in association with the transferred data, in accordance with one embodiment;

FIG. 14 shows a table which partially summarises the combinations of statuses referred to in FIGS. 11-13; and FIG. 15 illustrates a virtual machine environment which may be used.

Before referring to the figures to describe the particular embodiments shown therein, the following description of embodiments is provided.

As mentioned above, in capability-based architectures certain capabilities are defined for a given process, and an error can be triggered if there is an attempt to carry out operations outside the defined capabilities. Various types of capabilities may be defined, but one type of capability is a bounded pointer (which in one embodiment incorporates both a pointer value and associated range and permissions information). An apparatus adopting such a capability-based architecture will generally access values stored in memory as well as capability metadata provided in association with each value stored, in order to identify whether the value represents a capability, or instead represents general purpose data. It will be understood therefore that the term "value" is used generically herein to refer to either a capability or a data value, and where distinction is needed the terms "capability" or "data value" are used. Further, it should also be understood that in different embodiments a "data block" may correspond to different granularities of information. For example at one extreme a data block can correspond to the smallest group of bits which can be referenced in the architecture, with an associated item of capability metadata indicating whether that group represents a capability, or instead represents general purpose data. Conversely, in other embodiments a data block can correspond to an arbitrarily large defined group of bits, with an associated item of capability metadata indicating whether that group represents a capability, or instead represents general purpose data. Certain instructions can be used to reference a value which is stored and labelled as a capability by means of its capability metadata, and to perform operations dependent on that capability. For example, considering a bounded pointer, execution of such an instruction can cause the boundary pointer to be retrieved, and for the pointer value therein to then be used to derive an address in memory required during the execution of the instruction. The pointer value may be used directly to identify the memory address, or may be used to derive the memory address, for example by the addition of an offset to the pointer value. The operation will then be allowed to proceed provided that the memory address is within the range specified by the range information and any permissions specified in the permissions information are met.

In particular, in one embodiment, an apparatus is provided comprising cache storage wherein cache control circuitry associated with the cache storage administers a capability metadata modification marker in associated with data blocks stored in the cache storage, and the capability metadata modification marker is used to indicate whether the capability metadata (i.e. indicating whether a data block specifies a capability or a data value) has been modified since the data block was stored in the cache storage. By analogy to a data "dirty" bit which may be stored in association with a cached data item to indicate whether that data item has been modified since being cached, the capability metadata modification marker is also referred to herein as a capability tag "dirty" bit. Because of the significant difference in function between a data block which specifies a capability and a data block with specifies a data value, careful distinction between these two types of data block is generally required in the apparatus and therefore also when such data blocks are cached. The provision of the capability metadata modification marker supports this, in particular such that modification from one type to the other cannot take place unless intended, for example by means of the permissions inherited from the capability used to access the data value in question, but also further provides that efficiencies may be gained with regard to the storage of such data blocks having capability metadata associated therewith. One example of this latter feature may arise where data blocks and their associated capability metadata are stored separately, which may for example require separate accesses to the storage. Knowing whether capability metadata associated with a given storage block has changed since the data block was stored in the cache storage can for example, enable fewer accesses to the storage to be made.

Referring again to a data "dirty" bit which may be stored in association with a cached data item to indicate whether that data item has been modified since being cached, it should be noted that it is common for implementations of such cache dirty bits in fact merely to track whether a write to the data item has taken place. In other words, this approach does not distinguish between a write to the data item which re-wrote the value which the data item had previously and a write to the data item which wrote a different value to that which the data item had previously. This is because it would typically be too expensive (and not worthwhile) to check all data bits to see whether an actual change has happened. However according to the present techniques it is expected that there would typically be relatively few capability metadata bits, and so it is much more feasible to check whether those bits have actually changed. Moreover also expected that a data block of memory will typically retain its current usage (data or capability) for an extended period of time. An embodiment in which a value of the capability metadata modification marker is indicative of whether the capability metadata associated with the data block has been written (without testing for whether the data block has actually changed) since the data block was stored in the cache storage is nonetheless also proposed.

The correspondence between the capability metadata modification markers and the data blocks may be variously configured depending on the system requirements. In some embodiments one capability metadata modification marker corresponds to a plurality of data blocks comprising said data block. Various levels of granularity with respect to data stored in the cache are contemplated, but in some embodiments the capability metadata modification marker set by the cache control circuitry in association with the data block is a single bit for each cache line in the cache storage. Other embodiments can have different granularities of capability metadata modification marker, i.e. each corresponding to only a few data blocks or each corresponding to a large number of data blocks. In some embodiments there is a capability metadata modification marker for each data block, such that the capability metadata modification marker set in association with the data block has a one-to-one correspondence with said data block.

The information provided by the capability metadata modification marker may be used in a variety of ways, but in some embodiments the apparatus further comprises a memory controller responsive to a received write transaction for a specified data block and associated capability metadata from the cache storage to a further storage level to suppress a write transaction with respect to the associated capability metadata and the further storage level, when the value of the capability metadata modification marker is indicative that the capability metadata has not changed since the specified data block was stored in the cache storage. Accordingly the memory controller can identify, when handling such a write transaction for a specified data block, that there is no need for its associated capability metadata to be updated in the storage which is the target of the write transaction, where it is known that that capability metadata has not changed. In other words, where a capability was stored in the cache and may have been modified but remains a capability or conversely where a data value has been stored in the cache storage and has been modified but remains a data value, only the "value" itself needs updating by the write transaction to the target storage, and not the associated capability metadata.

The further storage which is the target of the transaction may take a variety of forms but in some embodiments is a memory storage. In other embodiments it may be a further cache storage level. Where the further storage is a memory storage, the write transaction may be a read-modify-write transaction with respect to the associated capability metadata in the memory storage. Accordingly, where such a read-modify-write transaction can be avoided by virtue of knowing that the target capability metadata has not been modified, two separate read and write transactions to the storage of the associated capability metadata storage can be avoided.

There may, in some embodiments, further be provided cache storage specifically for capability metadata, this being provided at a higher memory hierarchy level than the cache storage (i.e. between the cache storage and memory) to further support the avoidance of the latency associated with access to capability metadata in memory. In such embodiments the memory controller can reference the capability metadata cached in the capability metadata cache storage to determine whether access to the memory is required, and in particular to avoid such access when the capability metadata modification marker indicates that the required capability metadata has not changed since the at least one data block was stored in the cache storage. Accordingly, in some embodiments the apparatus further comprises capability metadata cache storage to store capability metadata at a higher memory hierarchy level than the cache storage, and wherein the memory controller is responsive to a memory access transaction for at least one data block to return required capability metadata associated with the at least one data block, and wherein the memory controller is responsive to the memory access transaction for the at least one data block, when the required capability metadata is not stored in the capability metadata cache storage, to initiate eviction of currently stored capability metadata from the capability metadata cache storage and retrieval of the required capability metadata into the capability metadata cache storage, unless the value of the capability metadata modification marker associated with the at least one data block is indicative that the required capability metadata has not changed since the at least one data block was stored in the cache storage.

The capability metadata may be stored in a variety of ways in the capability metadata cache storage, but a compact storage format may be achieved in which one bit stored in the capability metadata cache storage may be indicative of whether any of a plurality of bits of capability metadata are set or not. Accordingly, this provides a mechanism by which it can be rapidly identified whether the corresponding data stored in the memory in fact comprises only data value (and not capabilities) since it is expected that there may be significant contiguous chunks of memory for which this is true and upon identification of such sections by means of the information in the capability metadata cache storage only a single access to the storage may be required to implement the memory access transaction, i.e. only by accessing the at least one data block and dispensing with the need to access the corresponding capability metadata.

Indeed, the information stored in the capability metadata cache storage may be hierarchically stored, for example where tables of capability metadata are stored in memory at various granularities, and the capability metadata cache storage is able to hold lines of the tables in a typical line based caching structure. Then each bit in one of these tables can for example represent whether any of the adjacent set of bits in a lower level table is set and in the lowest level table, each bit can represent an individual capability metadata tag. Thus when such a capability metadata cache storage is present, the capability metadata modification marker enables the memory controller to avoid needing to ensure that a suitable line of capability metadata is in the capability metadata cache (to enable a fast read or write of the capability metadata information). If the line were not present it would require evicting an existing line from the capability metadata cache with a possible write back to memory, followed by a load of a line containing the capability metadata bits and also (where the above mentioned hierarchical levels of cache storage for this information are used in the capability metadata cache storage) further lines representing coarser grained capability metadata table information, in turn evicting and possibly writing back useful information from the cache. However, where the capability metadata modification information is available, then an indication that the capability metadata has not changed since reading from memory would then require no change to the capability metadata cache contents.

However, within a given cache line there may be a finer granularity of information and the capability metadata modification marker may be provided for respective portions of a cache line. Accordingly, in some embodiments the cache storage is capable of storing the data blocks in cache lines, and the capability metadata modification marker set by the cache control circuitry in association with the data block is one of plural bits for each cache line in the cache storage, and wherein each bit of the plural bits for each cache line is indicative of whether the capability metadata for a respective portion of said cache line has changed since the respective portion of said cache line was stored in the cache storage. Such multiple capability tag dirty bits being provided per cache line, each representing a portion of the line, may be provided up to the same granularity of data dirty bits provided for the respective portions of the cache line. Accordingly, in some embodiments the cache control circuitry is responsive to the write to the data block stored in the cache storage to store a data modification marker in association with a data block portion, wherein a value of the data modification marker is indicative of whether the data block portion has been written to since the data block was stored in the cache storage, and wherein the respective portion of said cache line corresponding to the capability metadata modification marker is at least as large as the data block portion. In accordance with the comments made above note that it is monitored if this data block portion has been written to (and not if the data block portion has in fact been changed) because it would typically be too expensive (and not worthwhile) to check all data bits to see whether an actual change has happened.

As mentioned above, a memory controller provided in the apparatus can make use of the value of the capability metadata modification marker indicating that the capability metadata stored in association with a specified data block has not changed since that specified data block was stored in the cache storage (from memory) to avoid certain accesses to memory. However, the present techniques further propose, in order to provide a further level of security with respect to the correct administration of the capability metadata, and in particular to ensure that false capabilities cannot be "forged" by multiple agents operating with respect to the same memory space, that steps may be taken in some embodiments in which multiple agents can access the same memory space to ensure that this cannot happen.

Accordingly, in some embodiments the apparatus further comprises a memory controller responsive to a received write transaction for a specified data block and associated capability metadata from the cache storage to a further storage level, when the capability metadata stored in association with the specified data block is indicative that it is a data value and the value of the capability metadata modification marker is indicative that the capability metadata stored in association with the specified data block has not changed since the specified data block was stored in the cache storage, to issue a memory write transaction to cause the capability metadata stored in memory actively to be set to indicate that the specified data block is a data value. Accordingly, even though it is known that the capability has not changed (by virtue of the value of the capability metadata modification marker) it may nonetheless be chosen to explicitly set (or rather, reset) the capability metadata to its value indicating that the specified data block is a data value (which in embodiments described herein is when the value is a 0, but this will be recognised as being an arbitrary implementation choice), thus ensuring that where a specified data block should hold a data value, it cannot be updated by multiple interactions with the same memory location (but different agents), to inadvertently or maliciously forge a capability. For example, if an agent A reads data from memory with associated capability tags unset (indicating data rather than capability) and an agent B subsequently writes a capability to the same location, followed by an eviction of the data from agent A with the capability tags still unset (and with the capability tags marked as unmodified), then if the memory controller were to choose not to clear the tags on the write from agent A this would allow a capability to be forged from the A data and the B tag. Explicitly resetting the capability metadata in indicate data can avoid this.

Another approach to this is provided in some embodiments in which the apparatus further comprises a memory controller responsive to a received write transaction for a specified data block and associated capability metadata from the cache storage to a further storage level, when the capability metadata stored in association with the specified data block is indicative that it is a data value, and when the memory controller has received a signal indicating that another agent has performed a write action to at least one of the specified data block and the associated capability metadata in memory since the specified data block was stored in the cache storage, to issue a memory write transaction to cause the capability metadata stored in memory actively to be set to indicate that the specified data block is a data value. Accordingly, where it is explicitly known that another agent has performed a write action to the same memory location the explicit resetting of the capability metadata to ensure that it is reset to indicate that the specified data block is a data value may be carried out, to avoid the possibility of such capability forging. Other approaches could include forbidding agent A and agent B from accessing the same memory locations.

The present techniques further contemplate that when the data block is transferred into or out of the cache storage, some embodiments may not also transfer the capability metadata modification marker and/or the data modification marker. In other words capability tag dirty bits and/or data dirty bits which may be stored in association with the data block in the cache may not move with the data block when it is transferred (whether into or out of the cache). In this situation certain constraints may be imposed on the target of the transfer in terms of what the capability metadata modification marker and/or the data modification marker (capability tag dirty bits and/or data dirty bits) are assumed to be.

In some embodiments the apparatus is responsive to transfer of the data block into or out of the cache storage, and when the value of the capability metadata modification marker indicates that the capability metadata associated with the data block has changed, to cause the data block to be treated as modified.

In some embodiments the apparatus is responsive to transfer of the data block into or out of the cache storage, and when a data modification marker is not transferred, to cause the data block and capability metadata modification marker to be treated as clean when the transfer is to a lower cache layer, to cause the data block and capability metadata modification marker to be treated as modified when the transfer is not to a lower cache layer.

In some embodiments the apparatus is responsive to transfer of the data block into or out of the cache storage, and when the capability metadata modification marker is not transferred, to cause the value of the capability metadata modification marker to be inferred from a data modification marker.

In some embodiments the apparatus is responsive to transfer of the data block into or out of the cache storage, and when the capability metadata is not transferred: when a data modification marker and the capability metadata modification marker both indicate unmodified, to cause a target of the transfer to treat the capability metadata as identifying the data block as specifying a data value; when the data modification marker and the capability metadata modification marker both indicate modified, to cause the target of the transfer to treat the capability metadata as identifying the data block as specifying a data value; and when the data modification marker indicates modified and the capability metadata modification marker indicates unmodified, to cause the target of the transfer to treat a local copy of the capability metadata modification marker as valid.

In some embodiments the apparatus is responsive to transfer of the data block into or out of the cache storage, and when the capability metadata is transferred: when a data modification marker and the capability metadata modification marker both indicate unmodified or when the data modification marker and the capability metadata modification marker both indicate modified, to cause a target of the transfer to treat the capability metadata as valid; and when the data modification marker indicates modified and the capability metadata modification marker indicates unmodified, to cause the target of the transfer to perform one of: not modifying a local copy of the capability metadata; updating the local copy of the capability metadata; or reporting an error if the local copy of the capability metadata differs to the transferred capability metadata.

In some embodiments there is provided a method of operating cache storage comprising the steps of: storing data blocks in the cache storage; storing capability metadata in association with each data block identifying whether each said data block specifies a capability or a data value, wherein at least one type of capability is a bounded pointer; and in response to a write to a data block stored in the cache storage, setting a capability metadata modification marker in association with the data block, wherein a value of the capability metadata modification marker is indicative of whether the capability metadata associated with the data block has changed since the data block was stored in the cache storage.

In some embodiments there is provided an apparatus comprising: means for caching data blocks; means for storing capability metadata in association with each data block identifying whether each said data block specifies a capability or a data value, wherein at least one type of capability is a bounded pointer; and means for setting a capability metadata modification marker in association with a data block stored in the means for caching data blocks, in response to a write to the data block, wherein a value of the capability metadata modification marker is indicative of whether the capability metadata associated with the data block has changed since the data block was stored in the means for caching data blocks.

Some particular embodiments will now be described with reference to the figures.

Figure 1:
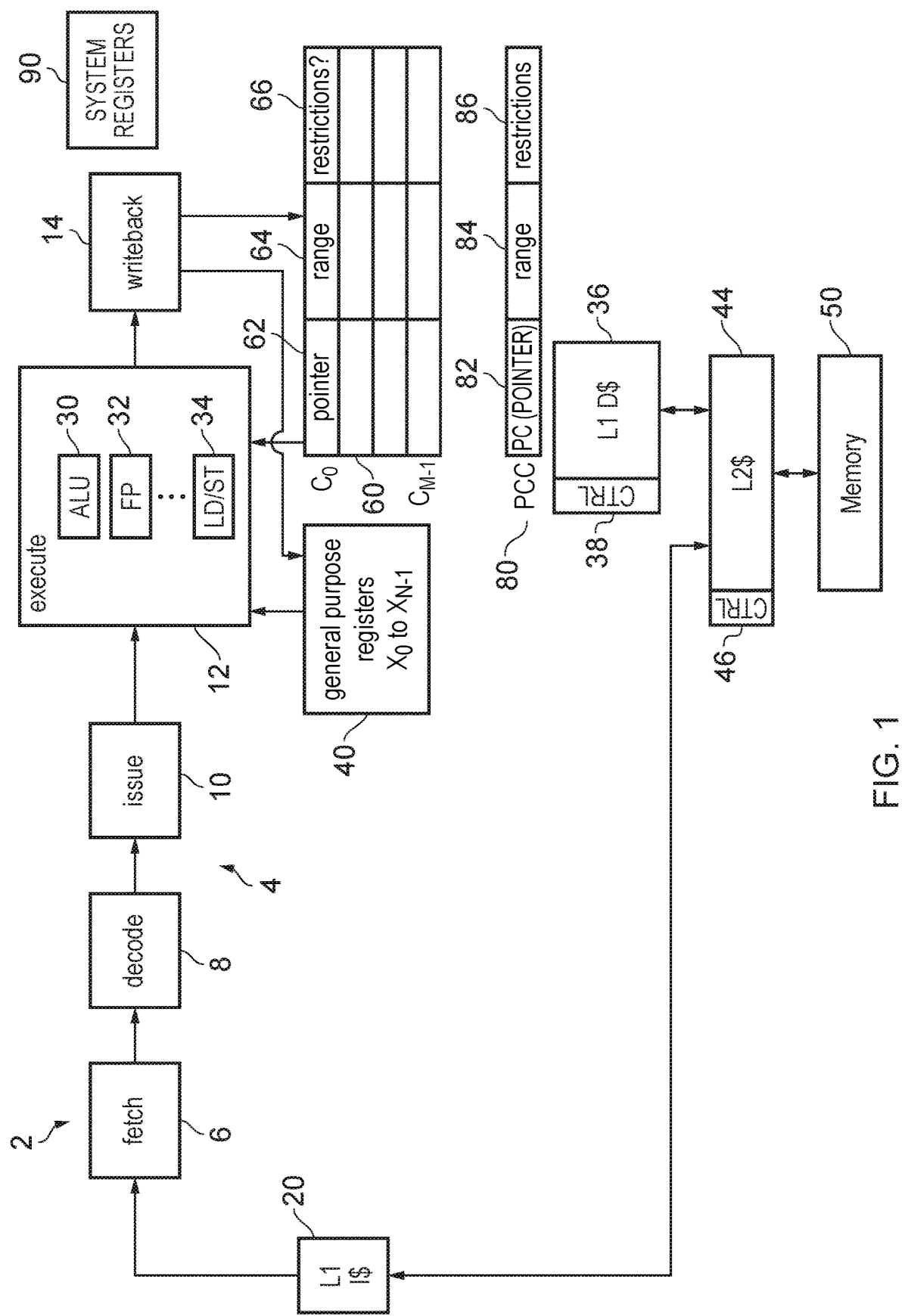

FIG. 1 schematically illustrates an example of a data processing apparatus 2 comprising a processing pipeline 4 for processing instructions. In this example the processing pipeline 4 includes a number of pipeline stages including a fetch stage 6, a decode stage 8, an issue stage 10, an execute stage 12, and a write back stage 14, but it will be appreciated that other types or combinations of stages may be provided. For example a rename stage for performing register renaming could be included in some embodiments. Instructions to be processed move from stage to stage, and while an instruction is pending at one stage another instruction may be pending at a different stage of the pipeline 4.

The fetch stage 6 fetches instructions from a level 1 (L1) instruction cache 20. The fetch stage 6 may usually fetch instructions sequentially from successive instruction addresses. However, the fetch stage also has branch prediction capability (not explicitly illustrated) to predict the outcome of branch instructions, and the fetch stage 6 can fetch instructions from a (non-sequential) branch target address if the branch is predicted taken, or from the next sequential address if the branch is predicted not taken. The fetched instructions are passed to the decode stage 8 which decodes the instructions to generate decoded instructions. The decoded instructions may comprise control information for controlling the execute stage 12 to execute the appropriate processing operations. For some more complex instructions fetched from the cache 20, the decode stage 8 may map those instructions to multiple decoded instructions, which may be known as micro-operations (μops or uops). Hence, there may not be a one-to-one relationship between the instructions fetched from the L1 instruction cache 20 and instructions as seen by later stages of the pipeline. In general, references to "instructions" in the present application should be interpreted as including micro-operations.

The decoded instructions are passed to the issue stage 10, which determines whether operands required for execution of the instructions are available and issues the instructions for execution when the operands are available. Some embodiments may support in-order processing so that instructions are issued for execution in an order corresponding to the program order in which instructions were fetched from the L1 instruction cache 20. Other embodiments may support out-of-order execution, so that instructions can be issued to the execute stage 12 in a different order from the program order. Out-of-order processing can be useful for improving performance because while an earlier instruction is stalled while awaiting operands, a later instruction in the program order whose operands are available can be executed first.

The issue stage 10 issues the instructions to the execute stage 12 where the instructions are executed to carry out various data processing operations. For example the execute stage may include a number of execute units 30, 32, 34 including an arithmetic/logic unit (ALU) 30 for carrying out arithmetic or logical operations on integer values, a floating-point (FP) unit 32 for carrying out operations on values represented in floating-point form, and a load/store unit 34 for carrying out load operations for loading a data value from a level 1 (L1) data cache 36 to a register 40 or store operations for storing a data value from a register 40 to the L1 data cache 36. It will be appreciated that these are just some examples of the types of execute units which could be provided, and many other kinds could also be provided. For carrying out the processing operations, the execute stage 12 may read data values from a set of registers 40. Results of the executed instructions may then be written back to the registers 40 by the write back stage 14.

The L1 instruction cache 20 and L1 data cache 36 may be part of a cache hierarchy including multiple levels of caches. For example a level two (L2) cache 44 may also be provided and optionally further levels of cache could be provided. In this example the L2 cache 44 is shared between the L1 instruction cache 20 and L1 data cache 36 but other examples may have separate L2 instruction and data caches. When an instruction to be fetched is not in the L1 instruction cache 20 then it can be fetched from the L2 cache 44 and similarly if the instruction is not in the L2 cache 44 then it can be fetched from main memory 50. Similarly, in response to load instructions, data can be fetched from the L2 cache 44 if it is not in the L1 data cache 36 and fetched from memory 50 if required. Any known scheme may be used for managing the cache hierarchy. The L1 data cache 36 and the L2 cache 44 are also shown to comprise control (CTRL) circuitry, which is described in more detail below with reference to the further figures.

The addresses used by the pipeline 4 to refer to program instructions and data values may be virtual addresses, but at least the main memory 50, and optionally also at least some levels of the cache hierarchy, may be physically addressed. A translation lookaside buffer (TLB) (not explicitly illustrated) may be provided for translating the virtual addresses used by the pipeline 4 into physical addresses used for accessing the cache or memory.

As shown in FIG. 1, the apparatus 2 may have a set of bounded pointer registers 60. Whilst the set of bounded pointer registers is shown in FIG. 1 as being physically separate to the set of general purpose data registers 40, in one embodiment the same physical storage may be used to provide both the general purpose data registers and the bounded pointer registers.

Each bounded pointer register 60 includes a pointer value 62 that may be used to determine an address of a data value to be accessed, and range information 64 specifying an allowable range of addresses when using the corresponding pointer 62. The bounded pointer register 60 may also include restrictions information 66 (also referred to herein as permissions information) which may define one or more restrictions/permissions on the use of the pointer. For example the restriction 66 could be used to restrict the types of instructions which may use the pointer 62, or the modes of the pipeline 4 in which the pointer can be used. Hence, the range information 64 and restriction information 66 may be considered to define capabilities within which the pointer 62 is allowed to be used. When an attempt is made to use a pointer 62 outside the defined capabilities, an error can be triggered. The range information 64 can be useful for example for ensuring that pointers remain within certain known bounds and do not stray to other areas of the memory address space which might contain sensitive or secure information. In an embodiment where the same physical storage is used for both general purpose data registers and bounded pointer registers, then in one embodiment the pointer value 62 may for example be stored within the same storage location as used for a corresponding general purpose register.

Figure 2:
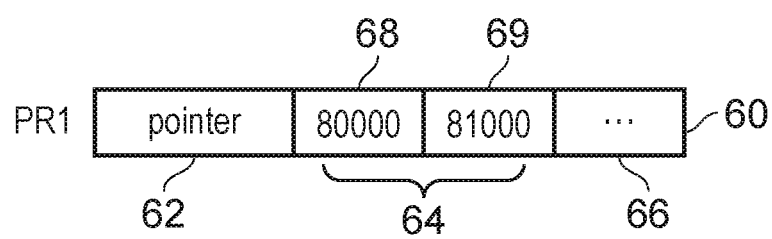
FIG. 2 shows examples of types of instruction for which an error may be triggered if there is an attempt to set or access a pointer value within the set of bounded pointer storage elements, where that pointer value is used to specify an address outside the range indicated by the associated range information.

FIG. 2 shows an example of types of instructions for which the allowable range is used to protect against unauthorised access to data or instructions. As shown in the top part of FIG. 2, a particular bounded pointer register PR1 includes a given pointer value 62 and range information 64, which in this example is specified using a lower bound address 68 defining the lower bound of the allowable range and an upper bound address 69 defining the upper bound of the allowable range. For example, the bounds 68, 69 are set to define a range of addresses 80000 to 81000. Errors may be triggered when certain instructions reference the bounded pointer register PR1 and the address determined from the pointer 62 is outside this range.

For example, as shown in part A of FIG. 2, in some systems an error may be triggered if there is an attempt to set the value of the pointer 62 in the pointer register 60 to a value lying outside the range specified by the range information 64 (here it being assumed that the pointer directly specifies an address). This avoids the pointer 62 taking any value outside the specified range so that any accesses using the pointer can be ensured to lie safely within the allowed range. Alternatively, as shown in part B of FIG. 2, an error can be triggered when an instruction attempts to access a location identified by the address of the pointer 62 when that address lies outside the specified range. Hence, it may still be allowable to set the pointer 62 to a value outside the specified range, but once a data access at the pointer address (or an address derived from the pointer) is attempted then an error may be triggered if the address lies outside the allowed range. Other systems may trigger errors in response to both the types of instruction shown in parts A and B of FIG. 2.

The range information 64 could be set in different ways. For example secure code, or an operating system or hypervisor, may specify the range allowed for a given pointer. For example, the instruction set architecture may include a number of instructions for setting or modifying the range information 64 for a given pointer 62, and execution of these instructions could be restricted to certain software or certain modes or exception states of the processor 4. Any known technique for setting or modifying the range information 64 could be used.

Figure 3:
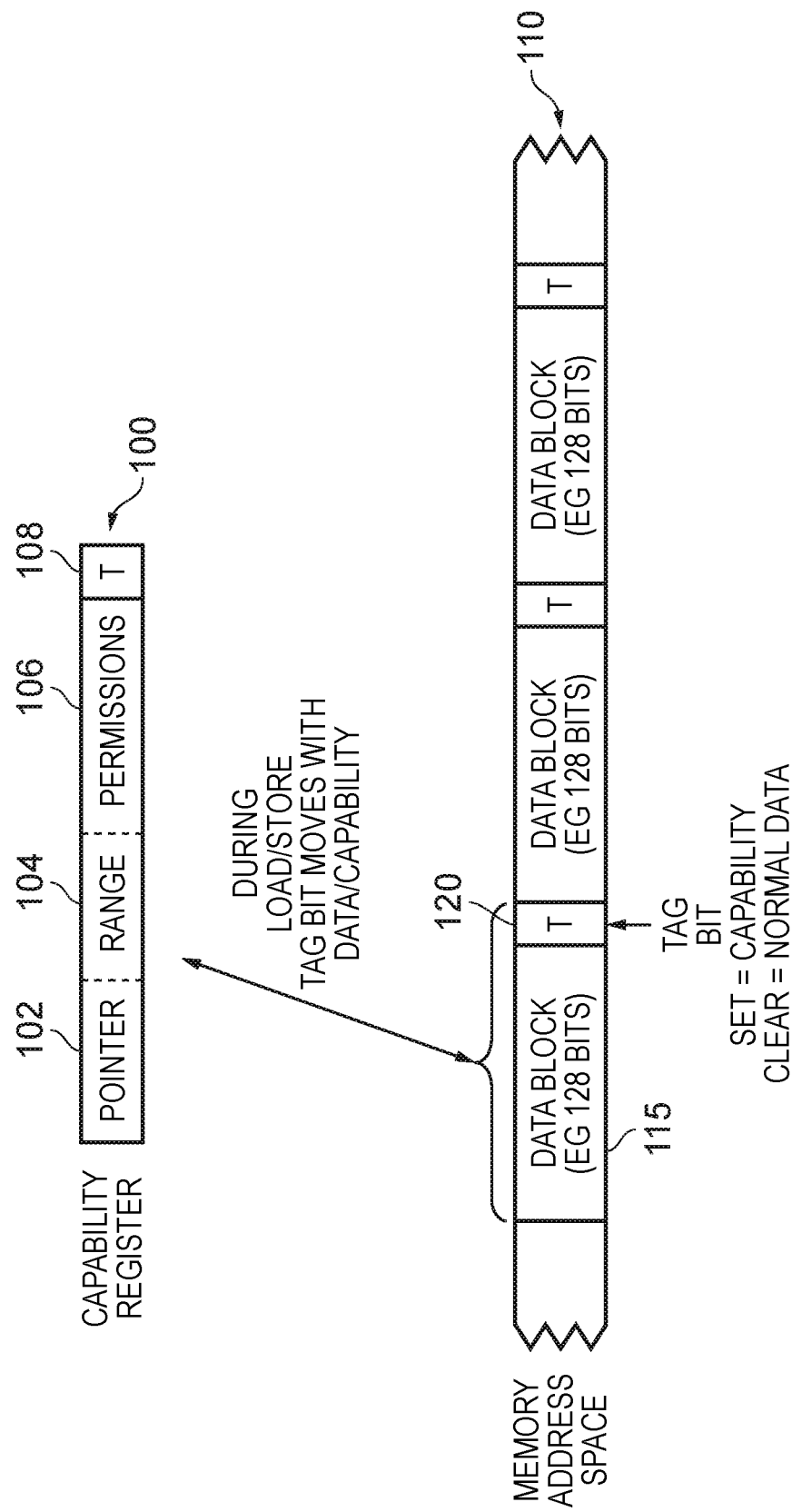
FIG. 3 illustrates the use of a capability tag bit in association with bounded pointers, in accordance with one embodiment.

In addition to the set of bounded pointer storage elements 60 that may be used at the execute stage 12 when executing certain instructions that make reference to a pointer, a program counter capability (PCC) register 80 may also be used to provide similar functionality at the fetch stage 6 when instructions are being fetched from the level one instruction cache 20. In particular, a program counter pointer may be stored in a field 82, with the PCC 80 also providing range information 84 and any appropriate restriction information 86, similar to the range and restriction information provided with each of the pointers in the set of bounded pointer storage elements 60. FIG. 3 schematically illustrates how a tag bit is used in association with individual data blocks to identify whether those data blocks represent a capability (i.e. a bounded pointer and associated restrictions information), or represent normal data. In particular, the memory address space 110 will store a series of data blocks 115, which typically will have a specified size. Purely for the sake of illustration, it is assumed in this example that each data block comprises 128 bits. In association with each data block 115, there is provided a tag field 120, which in one example is a single bit field referred to as the tag bit, which is set to identify that the associated data block represents a capability, and is cleared to indicate that the associated data block represents normal data, and hence cannot be treated as a capability. It will be appreciated that the actual value associated with the set or the clear state can vary dependent on the particular embodiment, but purely by way of illustration, in one embodiment if the tag bit has a value of 1, it indicates that the associated data block is a capability, and if it has a value of 0 it indicates that the associated data block contains normal data.

When a capability is loaded into one of the bounded pointer registers 60 (also referred to herein as a capability register), such as the capability register 100 shown in FIG. 3, then the tag bit moves with the capability information. Accordingly, when a capability is loaded into the capability register 100, the pointer 102, range information 104 and restrictions information 106 (hereafter referred to as the permissions information) will be loaded into the capability register. In addition, in association with that capability register, or as a specific bit field within it, the tag bit 108 will be set to identify that the contents represent a capability. Similarly, when a capability is stored back out to memory, the relevant tag bit 120 will be set in association with the data block in which the capability is stored. By such an approach, it is possible to distinguish between a capability and normal data, and hence ensure that normal data cannot be used as a capability.

Whilst in FIG. 3 a tag field containing a tag bit has been referred to, in a more general embodiment the tag bit is an example of capability metadata which may be associated with each capability. Hence, as shown in FIG. 4, a capability 150 stored in a storage element of the system (whether that be one of the capability registers 60 or a memory location within the memory address space 110) may have capability metadata 155 associated therewith. The capability metadata will identify whether the associated data block 150 does in fact represent a capability, or instead should be interpreted as general purpose data, and in one embodiment that information will be encoded as a tag bit within the capability metadata 155. The capability metadata may in one embodiment comprise solely the tag bit, but in alternative embodiments may comprise additional information if desired. For instance, types of data could be further sub-divided, with the capability metadata for example indicating ownership by a particular privilege level, fine-grained permissions, e.g. read only, etc.

The capabilities can take a variety of forms, but in the embodiment shown in FIG. 4 the capability is a bounded pointer. As shown, the bounded pointer is made up of the pointer value 160, the range information 165 and the permission attributes 170. The range information and permissions attributes may collectively be referred to as the attributes of the bounded pointer.

FIG. 5A shows an example cache line 200 which may be stored in some embodiments. As illustrated the cache line 200 comprises a tag address 201, a validity bit 202, a dirty bit 203, a capability tag dirty bit 204, capability tags 205 and 206, and data values 207 and 208. As the labelling of the capability tags and data values indicates there is a capability tag provided for each data value. By contrast note that in this cache line there is only one capability tag dirty bit 204 provided, which is used to track whether either of the capability tags 205 or 206 is modified during the lifetime of this cache line. FIG. 5B shows another cache line 210 which may be stored in some embodiments, which is similar to that illustrated in FIG. 5A. As illustrated the cache line 210 comprises a tag address 201, a validity bit 212, a dirty bit 213, two capability tag dirty bits 214 and 215, capability tags 216 and 217, and data values 218 and 218. The only difference between the example cache lines in FIG. 5A and FIG. 5B is that in the example of FIG. 5B there are two capability tag dirty bits 214 and 215 provided, such that there is one for each of the capability tags 216 and 217.

FIG. 5C schematically illustrates circuitry which is used in one embodiment to update a capability tag dirty bit stored in association with a data value when a write of that data value takes place. The circuitry is configured to buffer the data value 230 and its associated capability tag 232 which are subject to the write transaction before causing these to be stored (for example in a cache line) as the stored data value 234 and capability tag 236. The circuitry further comprises comparison logic 238 which takes as its inputs the capability tag 232 provided as part of the write transaction and the capability tag 236 (as previously stored). When these differ the capability tag dirty bit 238 stored in association with the stored data value 234 is set to indicate that the capability tag has changed. Note that a simpler variant is also proposed here (although not explicitly illustrated) in which the capability tag dirty bit 238 is set whenever an update is made to the data value 234 (even if this does not in fact modify the capability tag), this having the advantage that it does not require a full bit wise comparison of the capability tag values. However given that it is expected that the capability tag values are relatively small, the advantage gained by such a configuration may be relatively limited.

FIG. 6 schematically illustrates a data processing system 250 in one embodiment. The system comprises a CPU 252, a level 1 data cache 254 (having local cache control 256), a level 2 (unified) cache 258 (having a local cache control 260), a memory controller 262, a capability table cache 264, and a main memory 266. These components are arranged in the form of a cache hierarchy with which one of ordinary skill in the art will be familiar, in which smaller, faster cache storage is provided at the lower cache levels nearer to the CPU 252 and slower, larger cache capability is provided at higher cache levels closer to the memory 266. As illustrated in FIG. 6 a further cache level 268 may also be provided between the memory controller 262 and the main memory 266. The particular configuration of some of the components shown in FIG. 6 are discussed in more detail with references to the figures which follow.

FIG. 7A shows a sequence of steps which are taken in one embodiment to determine whether a data write transaction should include capability metadata. For example, these steps may be carried out by a memory controller 262 as illustrated in FIG. 6. At step 280 the flow loops until a write transaction targeting the next level in the cache/memory hierarchy is to be carried out. When this is the case the flow proceeds to step 282, where it is determined if the capability tag dirty bit (CTD) for the data value which is the subject of the write transaction is 0, i.e. indicating that the capability tag bit(s) associated with the data value or values which are the subject of the write transaction have not been modified. If this is not the case, i.e. they have been modified, then the flow proceeds to step 284 and the write transaction continues including the capability tag bit(s). In other words, the locally held values of these capability tags are also written out to the next level in the cache/memory hierarchy. It should be noted that the write transaction referred to in FIG. 7A may in fact be a read-modify-write transaction and therefore proceeding with the write transaction at step 284 (and below similarly at step 288) should be understood also to comprise an initial read transaction with respect to the capability tags (or not depending on the control flow). If however at step 282 it is determined that the capability tag dirty bit(s) are unset (0), indicating that no modification of the capability tag bit(s) has taken place, then the flow proceeds to step 286. At step 286 it is determined whether the capability tag(s) indicate data (as opposed to capability) and whether "active capability tag (CT) setting" is currently enabled. This is a technique for providing an additional level of security with regard to the capability tags which may, for example, be useful in the context of multiple agents writing to the same memory locations. This "active capability tag (CT) setting" can be generally set or can, for example, be set based on write activity information received from other cores (see input to memory controller 262 in FIG. 6). When both of these conditions are true then the flow proceeds to step 284 and the write transaction proceeds including the capability tags. This provides that even though the capability tags appear not to have changed they are explicitly reset to indicate data values (as opposed to a capability) to provide a further level of protection against the forging (whether inadvertent or malicious) of a capability which should not be created. Otherwise from step 286 the flow proceeds to step 288 where the write transaction proceeds without the capability tag bit(s). In other words only the updated value is written out to the next memory level. FIG. 7B provides one example of circuitry which may be used to implement this functionality, wherein a value 290 and its associated capability tags 292 are temporarily stored in buffers 294 and 296, and buffer 296 has an additional enable (EN) input taken from the capability tag dirty bit 298 stored in association with the value 290. Accordingly, this means that setting the CTD bit 298 means that the capability tag 292 will form part of the access to the next storage level.

FIG. 8 schematically illustrates a capability tag cache, such as that shown as item 264 in FIG. 6 in one embodiment. This capability tag cache may for example form part of the memory controller 262 or may be separately provided. In use the memory controller, in handling a write transaction to be passed to a next level in the cache memory hierarchy (which could be to the memory 266 or could be to a further cache level 268), makes reference to this capability tag cache. For example this can take place when the memory controller 262 is handling a write back transaction initiated by a lower cache level (closer to the CPU 252) which has evicted a dirty cache line. In the case of the memory controller passing this transaction to a next level in the cache memory this may be writing back dirty data from one cache level to another which is participating in an inclusive caching arrangement.

The capability tag cache, labelled 282 in FIG. 8, stores capability tag table information in a number of cache lines, which has been retrieved from a portion of the memory (see FIG. 6). Storage of the capability tag table information in the cache lines is based on the corresponding tag address of the value which is the subject of the write transaction. If so required, conversion circuitry 280 is provided to convert the tag address into an index for the capability tag cache. Generally operation of the capability tag cache is carried out according to conventional cache operation procedures, with the cache generally being fully occupied and when a cache miss occurs the required cache line is retrieved from memory and a victim cache line to be replaced is selected.

The cache lines in the capability tag cache 282 shown in FIG. 8 store capability tag table information for a hierarchical arrangement of the capability tag table information which is illustrated in the lower part of the figure. Each bit of the highest level table 286 of the structure (having 8 bits in this example) represents whether any of the bits in the next lower level table are set. Hence in the example shown, where no bits of table 290 are set the "summary" bit in table 286 is not set. Conversely where two bits of table 288 are set the "summary" bit in table 286 is set. The same principle applies to the relationship between the tables 288/290 and the tables they summarise at the next lower level (those labelled 292, 294, 296, and 298).

The benefit of the provision of capability tag cache 282 can be appreciated when it is considered that in a simple memory system the memory controller may store the capability tags in separate region of physical memory from the associated data. This being the case, then if the capability tag dirty information were not present, then for example on a write from the last level cache to memory the memory controller would in fact need to perform two write transactions: a first write to the memory holding the data; and a second read-modify-write on the memory containing the capability tag information. However, with the availability of the capability tag dirty information indicating that the capability tags were unchanged, this additional read-modify-write operation would not be necessary.

In this context, and in order to mitigate the cost of the extra look-ups required for capability tagged memory, a capability tag cache (such as 282 in FIG. 8) can be provided to reduce some of these additional accesses to memory. However, if such a capability tag cache were to be present, but without the capability tag dirty information proposed herein, then the memory controller would need to ensure that a suitable line of capability tag information were in the tag cache to enable a fast read or write of the tag information. If the line were not present it would require the eviction of an existing line from the tag cache, with a possible write back to memory, followed by a load of the line containing the tag bits, and likely further lines representing coarser grained tag table information, in turn evicting and possibly writing back useful information from the tag cache. Correspondingly, note that the arrows illustrating "load" and "evict" in FIG. 8 show (by means of the dashed arrow extensions) that more than one cache line may be loaded and more than one cache line may be evicted for each such update of the capability tag cache. Conversely, with the availability of the capability tag dirty information, an indication that the tags have not changed since reading from memory would then require no change to the capability tag cache contents. The hierarchical nature of the storage of the capability tag information further can accelerate the referencing of this locally stored capability tag information, since for example one bit which is unset ("0") at the highest level 286 of the hierarchy can indicate that a whole section of memory only contains data values and no capabilities.

FIG. 9 shows a sequence of steps which are taken in one embodiment when administering the capability tag dirty bits in a cache as proposed herein. The flow is illustrated to begin at step 300, where it is assumed that a value has been stored in a cache line of the cache with capability tag information stored atomically with that value. The flow then proceeds to step 302 where it is determined if a write to this cache line is to be actioned. When this is not the case the flow proceeds to step 308 where it is determined if an eviction of this cache line is to be actioned and this being case the (current) lifetime of this cache line is over, the flow concluding at step 310. However, when it is determined at step 302 that a write to this cache line is to be actioned, then at step 304 it is determined if the capability tag for the value which is the subject of the write has been modified. For example a bit-wise comparison can be made between the currently stored value of the capability tag and the value of the capability tag which is being provided with the value which is the subject of the write. If it is found that the capability tag has been modified then the flow proceeds to step 306, where a corresponding capability tag dirty bit is set, indicative of this modification. The paths converge at the next step of 308 where (as described above) it is determined if an eviction of this cache line is to be actioned and this being case the (current) lifetime of this cache line is over, the flow concluding at step 310. Otherwise this cache line remains in the cache and the flow returns to step 302.

FIG. 10 shows a sequence of steps which are taken in one embodiment when accessing a capability tag cache as proposed herein. For example these may be steps carried out by a memory controller such as 262 when accessing a capability tag cache such as 264 (see FIG. 6). The flow can be considered to begin at 320 where the process waits until a memory access is received. For example this may be a write transaction targeting the memory 266 (in the example of FIG. 6). When a memory access to be actioned is received the flow proceeds to step 322 where it is determined if a corresponding capability tag dirty (CTD) bit is available. If it is the next step is 324, where it is checked if the CTD bit is set. If it is not, indicating that the capability tag has not been modified, then the flow proceeds to step 334 where completion of the capability tag access is signalled, and the capability tag part of the memory access can be omitted. If however the CTD bit is set, or no corresponding CTD information is available, then the flow proceeds to step 326, where the memory controller accesses the capability tag table cache, performing a look up on the basis of the tag address information of the memory access. If corresponding capability tag information is not found in the capability tag table cache (i.e. there is a "miss") at step 328, then the flow proceeds via step 330 for an eviction of one or more capability tag table lines and replacement by new allocation of one or more capability tag table lines retrieved from memory. Thereafter (or directly from a "hit") at step 328, at step 332 the required capability tag table line(s) are accessed, and finally at step 334 completion of the capability tag access is signalled. Following step 334 the flow returns to step 320.

FIGS. 11, 12, and 13 illustrates some rules that are be imposed on the system in some embodiments for the situation when data is transferred into or out of the cache storage depending on whether system is arranged also to transfer the capability metadata modification marker (capability tag dirty (CTD) bit) and/or the data modification marker (data dirty bit). In other words capability tag dirty bits and/or data dirty bits which may be stored in association with the data block in the cache may not move with the data block when it is transferred (whether into or out of the cache). These rules apply certain constraints on the target of the transfer in terms of what the capability tag dirty bit(s) and/or the data dirty bit(s) are assumed to be.

Starting at step 400 in FIG. 11 (on the transfer of data into or out of the cache storage), if (step 402) the value of the capability tag dirty bit(s) indicates that the capability tag(s) associated with the data block has changed, then (step 404) the data must be treated as modified. On to step 406, if data dirty bit(s) are not also transferred, and if the transfer is to a lower cache level (towards the CPU) (step 408), then (step 410) the data and capability tag dirty bit(s) must be treated as clean. Otherwise (step 412), the data and capability tag dirty bit(s) must be treated as dirty.

When the capability tag dirty bit(s) are also transferred (step 414), then the data dirty bit(s) and capability tag dirty bit(s) (step 416) can be used as provided. If they are not transferred (proceed to step 418) and capability tag dirty bit(s) are also not transferred, then the capability tag dirty status must be inferred from the data dirty status. Hence if the capability tag bit(s) are not transferred (step 418, leading to step 420), then: if (step 420) the data and capability tag(s) are both marked as not dirty, then capability tag(s) are treated as unset (i.e. indicating data); if (step 424—FIG. 12) the data and capability tag(s) are both marked as dirty, then (step 426) the capability tag(s) are treated as unset (i.e. indicating data); and if (step 428) the data is marked as dirty and the capability tag(s) are marked as not dirty.

From step 418, if the capability tag bit(s) are transferred (reiterated at step 434 merely for ease of reading), then the flow leads to step 436. From here, if (step 436) the data and capability tag(s) are both marked as not dirty, or if (step 438) the data and capability tag(s) are both marked as dirty, then (step 440) the transferred capability tag(s) must be used by the target. Otherwise, if (step 442—FIG. 13) the data is marked as dirty and the capability tag(s) are marked as not dirty, then the target must (step 446) choose one of: not changing its copy of the capability tag(s); updating its copy of the capability tag(s); and reporting an error if its copy of the capability tag(s) differs from the provided capability tag(s). Otherwise both the transferred data and the transferred capability tag(s) are clean (step 444).

FIG. 14 sets out the meaning of the possible 16 combinations of information that may be present in a transaction in addition (or not) to the data transferred. Different embodiments of the present techniques can choose to how a transaction represents those combinations, i.e. whether capability tags and/or tag dirty state are present in a transaction is left to the implementation. Note that TDP can mostly be ignored for the purpose of working out what a transaction means, since TDP=0 just implies that TD=DD. DD mostly tells you whether the transaction is a read or a write, but embodiments are also contemplated in which cache lines could migrate inwards with dirty data, and then TD/TP indicates how this (slightly unusual) situation should be handled.

FIG. 15 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor (hardware) 530 running a host operating system (OS) 520 supporting a virtual machine (VM) program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 may be stored on a computer-readable storage medium (which may be a non-transitory medium), and provides an application program interface (instruction execution environment) to an application program 500 which is the same as the application program interface which would be provided by the real hardware which is the device being modelled by the virtual machine program 510. Thus, a model of the cache storage and the support for the method of operating cache storage described above may be provided in a virtual machine program 510 to provide an application 500 with an environment which behaves in the same manner as a hardware device having such a physical cache storage.

In brief overall summary apparatus comprising cache storage and a method of operating such a cache storage are provided. Data blocks in the cache storage have capability metadata stored in association therewith identifying whether the data block specifies a capability or a data value. At least one type of capability is a bounded pointer. Responsive to a write to a data block in the cache storage a capability metadata modification marker is set in association with the data block, indicative of whether the capability metadata associated with the data block has changed since the data block was stored in the cache storage. This supports the security of the system, such that modification of the use of a data block from a data value to a capability cannot take place unless intended. Efficiencies may also result when capability metadata is stored separately from other data in memory, as fewer accesses to memory can be made.

In the present application, the words "configured to . . . " or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:
1. An apparatus comprising:
   cache storage to store data blocks, each data block having capability metadata stored in association therewith identifying whether each said data block specifies a capability or a data value, wherein at least one type of capability is a bounded pointer; and cache control circuitry responsive to a write to a data block stored in the cache storage to set a capability metadata modification marker in association with the data block, wherein a value of the capability metadata modification marker is indicative of whether the capability metadata associated with the data block has changed since the data block was stored in the cache storage.

2. The apparatus as claimed in claim 1, wherein the capability metadata modification marker set in association with the data block corresponds to a plurality of data blocks comprising said data block.

3. The apparatus as claimed in claim 2, wherein the capability metadata modification marker set in association with the data block is a single bit for each cache line in the cache storage.

4. The apparatus as claimed in claim 1, wherein the capability metadata modification marker set in association with the data block has a one-to-one correspondence with said data block.

5. The apparatus as claimed in claim 1, further comprising:
a memory controller responsive to a received write transaction for a specified data block and associated capability metadata from the cache storage to a further storage level to suppress a write transaction with respect to the associated capability metadata and the further storage level, when the value of the capability metadata modification marker is indicative that the capability metadata has not changed since the specified data block was stored in the cache storage.

6. The apparatus as claimed in claim 5, wherein the further storage level is memory storage.

7. The apparatus as claimed in claim 5, wherein the further storage level is a further cache storage level.

8. The apparatus as claimed in claim 6, wherein the write transaction is a read-modify-write transaction with respect to the associated capability metadata in the memory storage.

9. The apparatus as claimed in claim 5, further comprising capability metadata cache storage to store capability metadata at a higher memory hierarchy level than the cache storage, and wherein the memory controller is responsive to a memory access transaction for at least one data block to return required capability metadata associated with the at least one data block,
and wherein the memory controller is responsive to the memory access transaction for the at least one data block, when the required capability metadata is not stored in the capability metadata cache storage, to initiate eviction of currently stored capability metadata from the capability metadata cache storage and retrieval of the required capability metadata into the capability metadata cache storage, unless the value of the capability metadata modification marker associated with the at least one data block is indicative that the required capability metadata has not changed since the at least one data block was stored in the cache storage.

10. The apparatus as claimed in claim 9, wherein each bit stored in the capability metadata cache storage is indicative of whether any of a plurality of bits of capability metadata are set or not.

11. The apparatus as claimed in claim 10, wherein the capability metadata cache storage comprises at least two hierarchical levels of storage, and each bit stored in a higher hierarchical level is indicative of whether any of a plurality of bits in a next lower hierarchical level are set or not.

12. The apparatus as claimed in claim 1, wherein the cache storage is capable of storing the data blocks in cache lines, and the capability metadata modification marker set by the cache control circuitry in association with the data block is one of plural bits for each cache line in the cache storage, and wherein each bit of the plural bits for each cache line is indicative of whether the capability metadata for a respective portion of said cache line has changed since the respective portion of said cache line was stored in the cache storage.

13. The apparatus as claimed in claim 12, wherein the cache control circuitry is responsive to the write to the data block stored in the cache storage to store a data modification marker in association with a data block portion, wherein a value of the data modification marker is indicative of whether the data block portion has been written to since the data block was stored in the cache storage, and
wherein the respective portion of said cache line corresponding to the capability metadata modification marker is at least as large as the data block portion.

14. The apparatus as claimed in claim 1, further comprising:
a memory controller responsive to a received write transaction for a specified data block and associated capability metadata from the cache storage to a further storage level, when the capability metadata stored in association with the specified data block is indicative that it is a data value and the value of the capability metadata modification marker is indicative that the capability metadata stored in association with the specified data block has not changed since the specified data block was stored in the cache storage, to issue a memory write transaction to cause the capability metadata stored in memory actively to be set to indicate that the specified data block is a data value.

15. The apparatus as claimed in claim 1, further comprising:
a memory controller responsive to a received write transaction for a specified data block and associated capability metadata from the cache storage to a further storage level, when the capability metadata stored in association with the specified data block is indicative that it is a data value, and when the memory controller has received a signal indicating that another agent has performed a write action to at least one of the specified data block and the associated capability metadata in memory since the specified data block was stored in the cache storage, to issue a memory write transaction to cause the capability metadata stored in memory actively to be set to indicate that the specified data block is a data value.

16. The apparatus as claimed in claim 1, wherein the apparatus is responsive to transfer of the data block into or out of the cache storage, and when the value of the capability metadata modification marker indicates that the capability metadata associated with the data block has changed, to cause the data block to be treated as modified.

17. The apparatus as claimed in claim 1, wherein the apparatus is responsive to transfer of the data block into or out of the cache storage, and when a data modification marker is not transferred,
to cause the data block and capability metadata modification marker to be treated as clean when the transfer is to a lower cache layer, to cause the data block and capability metadata modification marker to be treated as modified when the transfer is not to a lower cache layer.

18. The apparatus as claimed in claim 1, wherein the apparatus is responsive to transfer of the data block into or out of the cache storage, and when the capability metadata modification marker is not transferred, to cause the value of the capability metadata modification marker to be inferred from a data modification marker.

19. The apparatus as claimed in claim 1, wherein the apparatus is responsive to transfer of the data block into or out of the cache storage, and when the capability metadata is not transferred:

when a data modification marker and the capability metadata modification marker both indicate unmodified, to cause a target of the transfer to treat the capability metadata as identifying the data block as specifying a data value;

when the data modification marker and the capability metadata modification marker both indicate modified, to cause the target of the transfer to treat the capability metadata as identifying the data block as specifying a data value; and when the data modification marker indicates modified and the capability metadata modification marker indicates unmodified, to cause the target of the transfer to treat a local copy of the capability metadata modification marker as valid.

20. The apparatus as claimed in claim 1, wherein the apparatus is responsive to transfer of the data block into or out of the cache storage, and when the capability metadata is transferred:

when a data modification marker and the capability metadata modification marker both indicate unmodified or when the data modification marker and the capability metadata modification marker both indicate modified, to cause a target of the transfer to treat the capability metadata as valid; and when the data modification marker indicates modified and the capability metadata modification marker indicates unmodified, to cause the target of the transfer to perform one of:

not modifying a local copy of the capability metadata;

updating the local copy of the capability metadata; or reporting an error if the local copy of the capability metadata differs to the transferred capability metadata.

21. A non-transitory, computer-readable storage medium storing a virtual machine computer program comprising program instructions to control a host data processing apparatus to provide an instruction execution environment corresponding to the apparatus according to claim 1.

22. A method of operating cache storage comprising the steps of:

storing data blocks in the cache storage;

storing capability metadata in association with each data block identifying whether each said data block specifies a capability or a data value, wherein at least one type of capability is a bounded pointer; and in response to a write to a data block stored in the cache storage, setting a capability metadata modification marker in association with the data block, wherein a value of the capability metadata modification marker is indicative of whether the capability metadata associated with the data block has changed since the data block was stored in the cache storage.

* * * * *